Oct. 20, 1970 R. HINDS ET AL 3,535,177
FOLDING DIES
Filed Jan. 10, 1967 4 Sheets-Sheet 1

Inventor
RONALD HINDS
DAVID DUTTON
KENNETH GRAHAM
By
Attorney

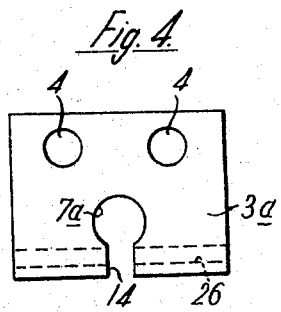
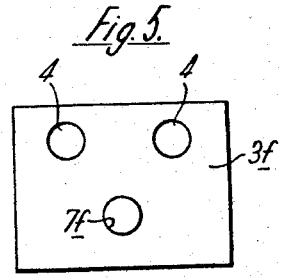
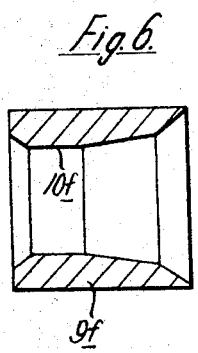
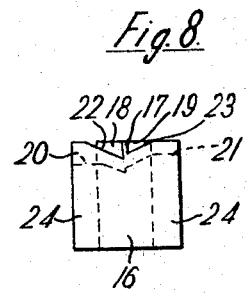
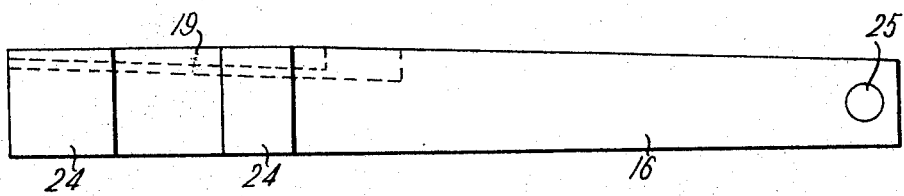
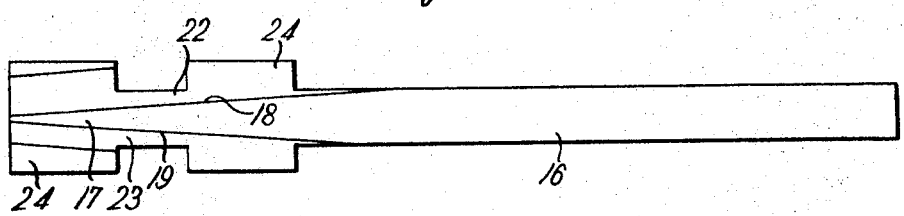

Oct. 20, 1970  R. HINDS ET AL  3,535,177
FOLDING DIES

Filed Jan. 10, 1967  4 Sheets-Sheet 4

Inventor
RONALD HINDS
DAVID DUTTON
KENNETH GRAHAM
By
Robinson Witt  Attorney 3,535,177
Patented Oct. 20, 1970

1

3,535,177
FOLDING DIES
Ronald Hinds, Woolton, Liverpool, David Dutton, Appleton, near Warrington, and Kenneth Graham, Warrington, England, assignors to British Insulated Callender's Cables Limited, London, England
Filed Jan. 10, 1967, Ser. No. 608,361
Claims priority, application Great Britain, Jan. 13, 1966, 1,672/66
Int. Cl. H01b *13/10*
U.S. Cl. 156—54                                    16 Claims

ABSTRACT OF THE DISCLOSURE

A die for folding transversely a longitudinally advancing strip of material to cause its edges to overlap to form a tube which may envelop a wire comprises a series of mutually spaced plates having axially aligned circular die apertures whose diameters progressively decrease along the series. A longitudinally extending blade whose side walls gradually converage towards one another projects into several of the die apertures but not at least the two smallest, the narrower end of the blade being remote from the entry end of the die. The longitudinal edges of an advancing strip of material are guided by the blade and the angular position of the overlap relative to the die is positively determined.

---

Figure 1:
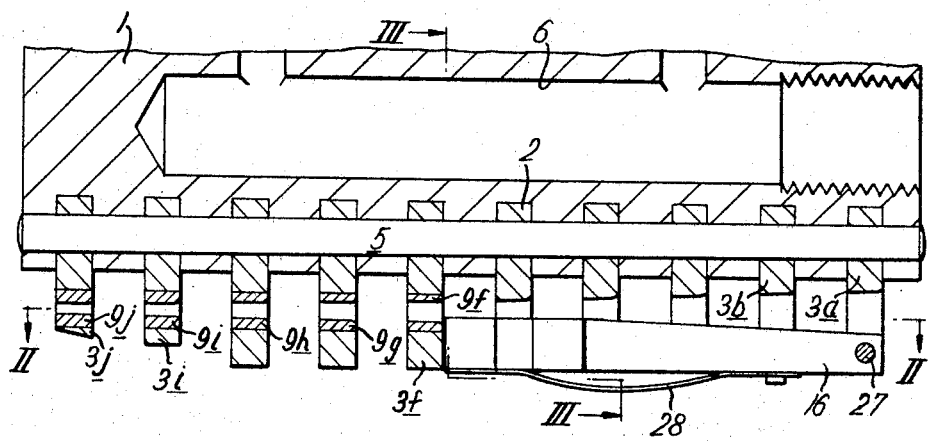

This invention relates to dies for folding a longitudinally advancing strip of material transversely to its length to bring its edges into overlapping relationship to form a tube which, if desired, may envelop a wire or other filamentary body.

It is an object of our invention to provide such a folding die that is of simple but effective form and which is especially, though by no means exclusively, useful for applying a narrow strip of paper longitudinally to wire to form paper insulated conductor suitable for use in dry core telephone cable manufacture.

In accordance with our invention we provide a novel form of folding die comprising a series of mutually spaced plates having axially aligned circular die apertures of which the diameters progressively decrease from a maximum at one end of the series to a minimum at the other end of the series and, projecting into several of the die apertures but not at least the two smallest, a longitudially extending blade whose side walls gradually converge towards one another as the trailing end of the blade is approached, whereby the longitudinal edges of a strip of material advancing through the folding die are guided by the blade and the angular position of the overlap relative to the die is positively determined.

By the expression "trailing end" as used in the specification and in the claims which form part thereof is meant that end which is remote from the inlet end of the die. The expression "leading end" means that end which is nearer the inlet end of the die.

Preferably the blade is upstanding from a support of greater thickness than the blade to provide on each side of the blade a step which is higher or lower than the step on the opposite side of the blade, whereby to position one longitudinal edge of the strip of material radially inner of the other thereby ensuring that on leaving the trailing end of the blade the longitudinal edges of the strip

2 approach one another positioned to assume an overlapping realtionship ahead of the trailing end of the blade.

Preferably, also at least the part of the step on each side of the blade adjoining the neighbouring sidewall of the blade is inclined at an acute angle to the wall so as to conform more nearly with the curvature of the neighbouring part of the wall of each die aperture.

We have found it better to taper the side walls of the blade slightly asymmetrically with respect to the axis of the die, the angle of taper of the wall running into the lower step being less than the angle of taper of the opposite wall. We prefer to use angles of blade taper of approximately 3.5° and approximatley 4.5°, respectively. We also prefer to arrange for the side walls of the blade to diverge slighlty as the radially inner surface of the blade is approached.

Figure 2:
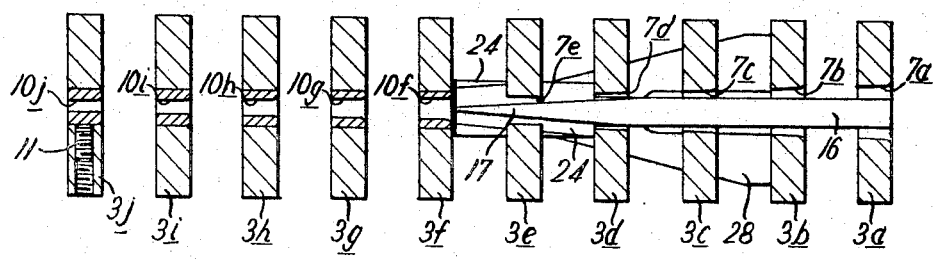
Figure 3:
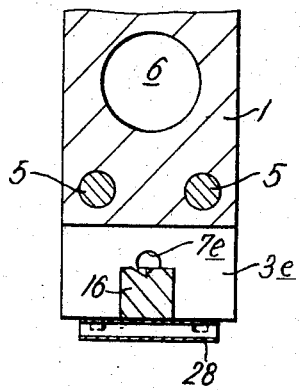

By way of example and to enable the invention to be more readily understood, a description will now be given, with reference to the accompanying drawings, of our preferred form of die for folding paper strip having a width of 0.25" (5.1 mm.) and a thicknes of 0.0025" (0.064 mm.) about a copper conductor having a diameter of 0.02" (0.51 mm.) to tubular shape with its longitudinal edges overlapping one another over an arc of approximately 342°. In the accompanying drawings, which for convenience are drawn on enlarged scales:

FIG. 1 is a side view, partly in section, of our preferred form of folding die,

FIGS. 2 and 3, respectively, are sections taken on the lines II—II and III—III in FIG. 1, FIG. 4 is an end elevation of a typical die plate for location in the leading part of the die, FIG. 5 is an end elevation of a typical die plate for location in the trailing part of the die, FIG. 6 is a sectional view on an enlarged scale as compared with that of FIGS. 1 to 5 of a bush suitable for fitting in the aperture of the plate shown in FIG. 5, FIGS. 7, 8 and 9, respectively, are side and end elevations and a plan view on an enlarged scale as compared with that of FIGS. 1 to 5 of the longitudinally extending blade and its support, and FIG. 10 (*a* to *k*) is a series of cross-sectional views on an enlarged scale as compared with that of FIGS. 1 to 5 through the folding die showing how the die folds a paper strip about a conductor.

As will be seen on referring to FIGS. 1 to 9, the folding die itself comprises a series of ten mutually spaced rectangular steel plates 3 (*a* to *j*) each 0.125" (3.18 mm.) thick. These plates 3 are housed in a corresponding number of parallel through slots 2 in one edge of a die holder 1 in the form of a rectangular prism and are held in their respective housings by a pair of dowels 5 which pass through holes 4 drilled through the plates 3 (FIGS. 4 and 5) and through holes in the walls of the slots 2 after their assembly. Each plate 3 (*a* to *j*) has in the part which projects beyond the holder 1 a circular hole 7 (*a* to *j*), these holes being in axial alignment with one another and having diameters which progressively decrease from a maximum at the leading end of the die to a minimum at its trailing end. Each of the holes 7 (*a* to *e*) in the plates 3 (*a* to *e*) forms a die aperture whose wall lies on the surface of revolution about the die axis of a line spaced from and inclined at a small angle to the die axis. In the plates 3 (*f* to *j*) the holes 7 (*f* to *j*) are cylindrical and tightly fitted in each is a bush 9 (*f* to *j*) of tungsten carbide or other suitable wear-resistant material whose bore 10 (f to j) constitutes a die aperture and which may in some cases be held in the hole by a grub screw 11. As is more clearly shown in FIG. 6 the bore 10 (f to j) of each of the bushes 9 (f to j) tapers towards the trailing end of the die over approximately the first part of its length and is cylindrical over the major part of the remainder of its length. The entry end of each of the holes 7 (a to e) and the entry and exit ends of the bores 10 (f to j) of the bushes 9 (f to j) are each bell-mouthed to insure smooth passage of the transversely folded strip. In the die shown in FIGS. 1 to 3 the diameter at the entry end of the die aperture 7a in the plate 3a is 0.173" (4.4 mm.) and the diameter of the cylindrical part of the die aperture 10j is 0.035" (0.89 mm.).

In each of the steel plates 3 (a to e) is a slot 14 (FIG. 4) running from the edge of the plate opposite the die holder 1 to the edge of the hole 7 (a to e) in the plate. All the slots 14 have parallel side walls 0.094" (2.4 mm.) apart and are in alignment with one another and their common median plane contains the common axis of the holes 7 (a to e). Fitting in the slots 14 in a manner which will hereinafter be described is a bar 16 which projects into the die apertures 7 (a to e) and which has integral therewith a longitudinally extending blade 17.

As is more clearly shown in FIGS. 7 to 9 the bar 16 is of rectangular cross section. From a point approximately half way along the bar 16 upper (i.e., radially inner with respect to the die) parts 18 and 19 of the side walls of the bar gradually converge slightly asymmetrically, at angles to the die axis of 3.5° and 4.5° respectively, as they approach the trailing end of the bar to form the longitudinally extending blade 17. The upper parts 18 and 19 of the side walls also diverge slightly as the upper surface of the blade is approached, the face of each upper part making an angle of 5° with the median plane of the bar 16. Steps 20 and 21 formed between the converging upper parts 18 and 19 and the parallel lower parts of the side walls of the bar 16 each have a depth which gradually decreases as the trailing end of the bar is approached, the surface of each step lying at an angle of 2° to the plane containing the upper surface of the blade and the step 20 being of a greater depth than the step 21. Parts 22 and 23 of the steps 20 and 21 which adjoin the neighbouring walls 18 and 19 of the blade 17 are each inclined at an angle of 65° to the median plane of the bar 16 so as to conform more closely to the curvature of the neighbouring wall of each die aperture into which the blade 17 projects. The upper surface of the bar 16 that lies between the blade 17 and the leading end of the bar lies at an angle of 2° to the plane containing the upper surface of the blade. The trailing end of the bar 16 has lateral projections 24 which are of such a width as to fit between adjacent die plates thereby providing means for positively longitudinally positioning the bar and its blade 17 relative to the die.

As previously described the bar 16 fits in the slots 14 of the plates 3 (a to e). The bar is secured to the plate 3a at the leading end of the die by a pin 27 which passes through a hole 25 in the bar and through pin holes 26 in the side walls of the slot 14 (FIG. 4). Positive longitudinal positioning of the bar 16 relative to the die by the lateral projections 24 at the trailing end of the bar facilitates insertion of the pin 27. The bar 16 is retained in position in the slots 14 by a leaf spring 28 which is secured to the underface of the plate 3b and which engages the underface of the bar and urges it radially inwardly with respect to the die. The bar 16 is so positioned in the slots 14 that the upper, or radially inner, surface of that part of the blade 17 projecting into the die aperture 7e does so to an extent to bring the steps 20 and 21 on each side of it approximately flush with the adjoining surfaces of the wall of the die aperture. Also the bar 16 is so positioned that the part of the bar extending between its leading end and the leading end of the blade 17 projects into die apertures 7(a to e) so that it serves to limit rotation of an advancing strip of material entering the die and, if necessary, to engage a longitudinal edge of the strip in order to bring the strip into its correct angular position before it is engaged by the blade. Since in this region of the die a strip of material is transversely bent to an arc substantially less than 360° and thus does not normally come into contact with the side walls of the bar 16 until it nears the leading or thicker end of the blade 17, the upper surface of the bar may alternatively be arranged to be substantially flush with the walls of the die apertures 7 (a to e).

Figure 10A:
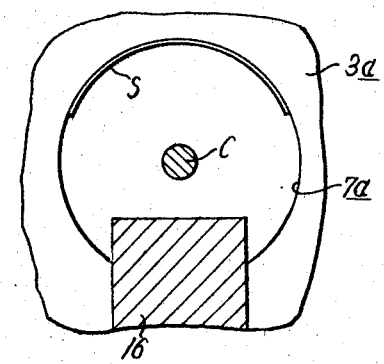
Figure 10B:
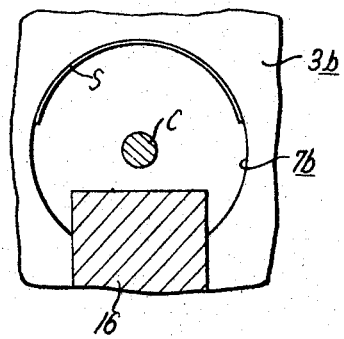
Figure 10C:
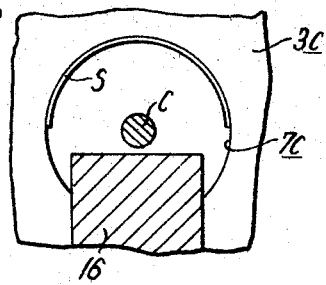
Figure 10D:
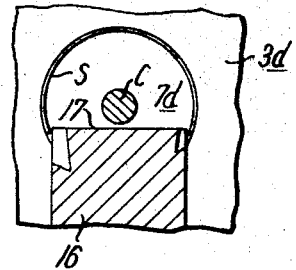
Figure 10E:
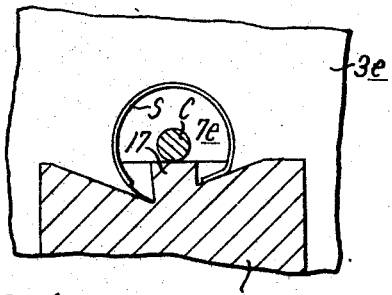
Figure 10F:
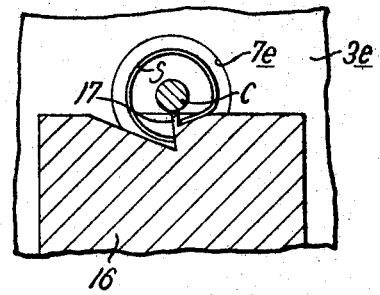
Figure 10G:
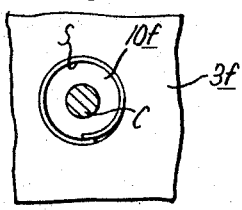
Figure 10H:
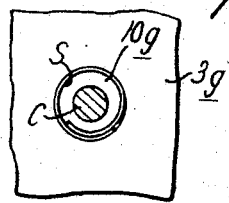
Figure 10I:
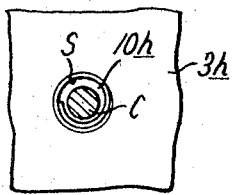
Figure 10J:
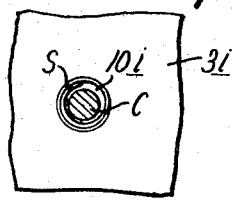
Figure 10K:
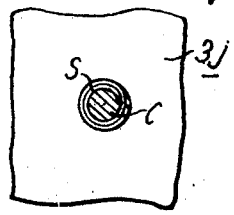

The series of cross-sectional views shown in FIG. 10 (a to k) and illustrating how the die of the present invention folds a paper strip S about a conductor C are taken at the trailing end of each die aperture with the exception of FIG. 10(f) which is taken at the trailing end of the folding blade 17.

As will be seen on referring to FIG. 10 (a to d) in passing through the die apertures 7 (a to d) of the first four die plates 3 (a to d) the advancing paper strip S is folded through a gradually increasing angle until on emerging from die plate 3d the strip subtends an angle of approximately 220° at the centre of the conductor C. As previously described a part of the bar 16 projects into the die apertures 7 (a to d) thereby serving to limit rotation of the advancing paper strip S and, if required, to engage a longitudinal edge of the strip in order to bring the strip into its correct angular position before it is engaged by the blade 17. Between the die plate 3d and the die plate 3f, as shown in FIGS. 10 (a and f), the longitudinal edges of the paper strip S each gradually come into contact firstly with the steps 20 and 21 on each side of the blade 17 and subsequently with the converging side walls 18 and 19 of the blade whereby the longitudinal edges are guided one radially inner of the other thereby ensuring that on leaving the trailing end of the blade and entering the die plate 3f the longitudinal edges are positioned to assume an overlapping relationship. As the paper strip S advances through the die apertures 10 (f to j) of the die plates 3 (f to j), as shown in FIG. 10 (g to k), the angle of overlap of the longitudinal edges of the strip gradually increases until, on emerging from the die plate 3j, the strip is folded around the conductor with an angle of overlap between its longitudinal edges of approximately 342°.

Our improved folding die may be used in the manufacture of paper insulated conductors by the method and apparatus described and claimed in U.S. Pat. application Ser. No. 603,029, filed Dec. 19, 1966, now abandoned.

In this case the folding die will be angularly positioned about its axis in such a way that the folded paper strip leaving the die will run on to the peripherally grooved heated wheel or other heated arcuate surface with the overlapping parts of the folded strip located between the paper covered conductor and the heated surface. To accommodate the heated wheel or other heated arcuate surface adjacent the trailing end of the die the lower part of each of the plates 3i and 3j is cut away. The die plates 3 (a to j) may be cooled by the circulation of a coolant such as water through passages 6 provided in the die holder 1. In lieu of, or in addition to, the circulating coolant a blast of cold air may be directed on to the plates.

What we claim as our invention is:

1. A die for folding a longitudinally advancing strip of material transversely to its length to bring its edges into overlapping relationship to form a tube, which folding die comprises a series of mutually spaced plates having axially aligned circular die apertures of which the diameters progressively decrease from a maximum at one end of the series to a minimum at the other end of the series and, projecting into several of the die apertures but not at least the two smallest, a longitudinally extending blade having side walls which gradually converge towards one another as the trailing end of the blade is approached to guide the longitudinal edges of a strip of material advancing through the folding die and to determine positively the angular position of the overlap relative to the die.

2. A die for folding a longitudinally advancing strip of material transversely to its length to bring its edges into overlapping relationship to form a tube, which folding die comprises a series of mutually spaced plates having axially aligned circular die apertures of which the diameters progressively decrease from a maximum at one end of the series to a minimum at the other end of the series, support means and a longitudinally extending blade which is upstanding from said support means and which projects into several of the die apertures but not at least the two smallest, the blade support means being of greater thickness than the blade to provide on each side of the blade a step which is of a different depth to that of the step on the opposite side of the blade to position one of the longitudinal edges of a strip of material advancing through the folding die radially inner of the other to ensure that on leaving the trailing end of the blade the longitudinal edges approach one another positioned to assume an overlapping relationship ahead of the trailing end of the blade and the blade having sidewalls which gradually converge towards one another as the trailing end of the blade is approached to guide the longitudinal edges of the advancing strip and to determine positively the angular position of the overlap relative to the die.

3. A die for folding a longitudinally advancing strip of material transversely to its length to bring its edges into overlapping relationship to form a tube, which folding die comprises a die holder having a plurality of mutually spaced parallel through slots in one edge, a series of parallel plates housed in said slots, the parts of the plates which project beyond the holder having axially aligned circular die apertures of which the diameters progressively decrease from a maximum at one end of the series to a minimum at the other end of the series and some of the plates, other than at least the two plates with die apertures of smallest diameter, each having a slot running from one edge of the plate to the edge of the die aperture in the plate, which slots are in alignment with one another with their common median plane containing the common axis of the die apertures, a bar which fits in the slots of the slotted plates, and a longitudinally extending blade which is carried by the bar and which projects into the die apertures of at least some of the slotted plates, the blade having sidewalls which gradually converge towards one another as the trailing end of the blade is approached to guide the longitudinal edges of a strip of material advancing through the folding die and to determine positively the angular position of the overlap relative to the die.

4. A die for folding a longitudinally advancing strip of material transversely to its length to bring its edges into overlapping relationship to form a tube, which folding die comprises a die holder having a plurality of mutually spaced parallel through slots in one edge, a series of parallel plates housed in said slots, the parts of the plates which project beyond the holder having axially aligned circuar die apertures of which the diameters progressively decrease from a maximum at one end of the series to a minimum at the other end of the series and some of the plates, other than at least the two plates with die apertures of smallest diameter, each having a slot running from one edge of the plate to the edge of the die aperture in the plate, which slots are in alignment with one another with their common median plane containing the common axis of the die apertures, a bar which fits in the slots of the slotted plates, and a longitudinally extending blade which is carried by the bar and which projects into the die apertures of at least some of the slotted plates, the bar being of greater thickness than the blade to provide on each side of the blade a step which is of a different depth to that of the step on the opposite side of the blade to position one of the longitudinal edges of a strip of material advancing through the folding die radially inner of the other to ensure that on leaving the trailing end of the blade the longitudinal edges approach one another positioned to assume an overlapping relationship ahead of the trailing end of the blade and the blade having sidewalls which gradually converge towards one another as the trailing end of the blade is approached to guide the longitudinal edges of the advancing strip and to determine positively the angular position of the overlap relative to the die.

5. A folding die as claimed in claim 4, wherein the blade is an integral part of the bar and extends from a point between the ends of the bar to the trailing end thereof, the radially inner surface of the part of the bar lying between the blade and the leading end of the bar lying at a small angle to the radially inner surface of the blade.

6. A folding die as claimed in claim 4, wherein each step has a depth which gradually decreases as the trailing end of the blade is approached.

7. A folding die as claimed in claim 4, wherein at least the part of the step on each side of the blade adjoining the neighboring wall of the blade is inclined at an acute angle to the wall so as to conform more nearly with the curvature of the neighboring part of the wall of each die aperture.

8. A folding die as claimed in claim 4, wherein the sidewalls of the blade are tapered slightly asymmetrically with respect to the axis of the die, the angle of taper of the wall running into the lower step being less than the angle of taper of the opposite wall.

9. A folding die as claimed in claim 4, wherein the sidewalls of the blade diverge slightly as the radially inner surface of the blade is approached.

10. A folding die as claimed in claim 4, wherein the wall of the die aperture of each of at least some of the slotted plates lies on the surface of revolution about the die axis of a line spaced from and inclined at a small angle to the die axis.

11. A folding die as claimed in claim 4, wherein a bush of wear-resistant material is fitted in a through hole in each of at least some of the plates, the bore of the bush constituting the die aperture of said plate.

12. A folding die as claimed in claim 4, wherein the bar is so positioned in the slots of the slotted plates that the radially inner surface of the blade adjacent its trailing end projects into the die aperture of each plate through which it passes to an extent to bring the steps on each side of it approximately flush with the adjoining surfaces of the wall of the die aperture.

13. A folding die as claimed in claim 4, wherein the bar is so positioned in the slots of the slotted plates that it projects into the die apertures of the plates at the leading end of the die to an extent to limit rotation of the advancing strip material entering the die and, if necessary, to engage a longitudinal edge of the strip to bring the strip into its correct angular position before it is engaged by the blade.

14. A folding die as claimed in claim 4, wherein the bar is secured to a slotted plate at the leading end of the die and spring means secured to another of the slotted plates engages the radially outer surface of the bar and retains the bar in position in the slotted plates.

15. A folding die as claimed in claim 14, wherein the trailing end of the bar is provided with lateral projections which fit between two of the die plates to locate positively the longitudinal position of the bar and blade relative to the die.

16. In a method of folding a longitudinally advancing strip of material transversely to its length to bring its edges into overlapping relationship to form a tube which envelops a longitudinally advancing wire, the improvement which comprises simultaneously longitudinally advancing the wire and strip through a series of mutually spaced plates having axially aligned circular die apertures of which the diameters progressively decrease from a maximum at the leading end of the series to a minimum at the trailing end of the series to curl the strip transversely around the wire, guiding the edges of the strip by means of a longitudinally extending blade which projects into several of the die apertures but not at least the two smallest and which has sidewalls gradually converging towards one another as the trailing end of the blade is approached to determine positively the angular position of the overlap relative to the die apertures, and drawing the wire and strip through at least the last two die apertures of the series to complete the folding of the strip around the wire.

References Cited

UNITED STATES PATENTS

| | | | |
|---|---|---|---|
| 3,045,563 | 7/1962 | Russo | 93—82 |
| 3,337,386 | 8/1967 | Burr | 93—82 X |

FOREIGN PATENTS 872,741  2/1942  France.

VERLIN R. PENDEGRASS, Primary Examiner